United States Patent
Ohshima et al.

(10) Patent No.: US 8,319,617 B2
(45) Date of Patent: Nov. 27, 2012

(54) VEHICLE SURROUNDINGS MONITORING APPARATUS

(75) Inventors: Kenichi Ohshima, Shimotsuke (JP);
Shigenobu Saigusa, Utsunomiya (JP);
Yasuhiro Konishi, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 355 days.

(21) Appl. No.: 12/584,869

(22) Filed: Sep. 14, 2009

(65) Prior Publication Data

US 2010/0066518 A1    Mar. 18, 2010

(30) Foreign Application Priority Data

Sep. 16, 2008 (JP) .................. 2008-236882

(51) Int. Cl.
*B60Q 1/00* (2006.01)

(52) U.S. Cl. .................................................... 340/435

(58) Field of Classification Search ............. 340/435, 340/933, 436, 425.5; 348/118, 153
See application file for complete search history.

(56) References Cited

U.S. PATENT DOCUMENTS

| | | | |
|---|---|---|---|
| 5,574,443 A * | 11/1996 | Hsieh | 340/901 |
| 6,539,288 B2 | 3/2003 | Ishida et al. | |
| 7,161,616 B1 * | 1/2007 | Okamoto et al. | 348/148 |
| 7,190,259 B2 | 3/2007 | Kumata et al. | |
| 7,248,283 B2 * | 7/2007 | Takagi et al. | 348/118 |
| 7,592,928 B2 * | 9/2009 | Chinomi et al. | 340/932.2 |
| 7,634,110 B2 * | 12/2009 | Oka et al. | 382/104 |
| 8,004,394 B2 * | 8/2011 | Englander | 340/433 |
| 2005/0128061 A1 * | 6/2005 | Yanai | 340/435 |
| 2005/0174429 A1 * | 8/2005 | Yanai | 348/148 |
| 2005/0240342 A1 * | 10/2005 | Ishihara et al. | 701/208 |
| 2006/0209190 A1 * | 9/2006 | Walters et al. | 348/148 |
| 2008/0012940 A1 * | 1/2008 | Kanaoka et al. | 348/148 |

FOREIGN PATENT DOCUMENTS

| | | |
|---|---|---|
| EP | 1158804 A2 | 11/2001 |
| EP | 1547866 A1 | 6/2005 |
| JP | 2003-069770 A | 3/2003 |
| JP | 2004-096359 | 3/2004 |
| JP | 2004-312063 A | 11/2004 |
| JP | 2008-141622 A | 6/2008 |

* cited by examiner

*Primary Examiner* — Phung Nguyen
(74) *Attorney, Agent, or Firm* — Carrier Blackman & Associates, P.C.; William D. Blackman; Joseph P. Carrier

(57) ABSTRACT

A vehicle surroundings monitoring apparatus includes: a plurality of imaging units which capture an external region of a present-vehicle and output images; a display unit which is installed in an interior of the present-vehicle; a selector which selects an image to be displayed on the display unit from the images output from the imaging units; and a display control unit which displays the images output from the imaging units on the display unit so as to be switched in accordance with a selection by the selector and displays an image indicator display indicating a display region in the external region of the present-vehicle corresponding to the images so as to be switched by the selector on the display unit.

6 Claims, 16 Drawing Sheets

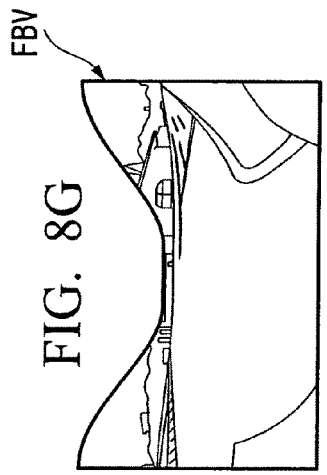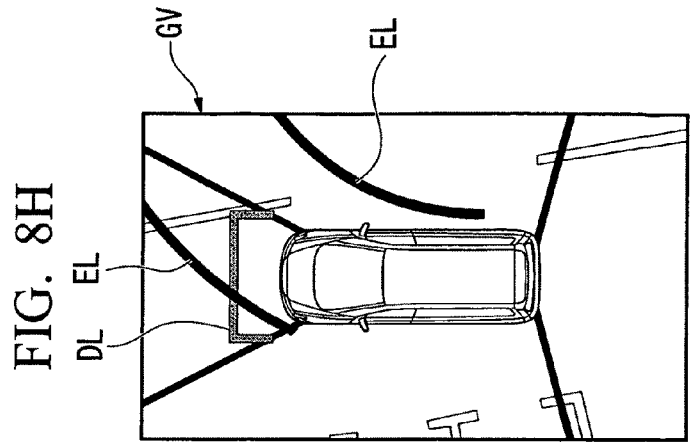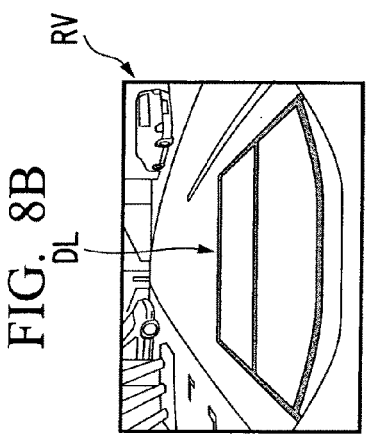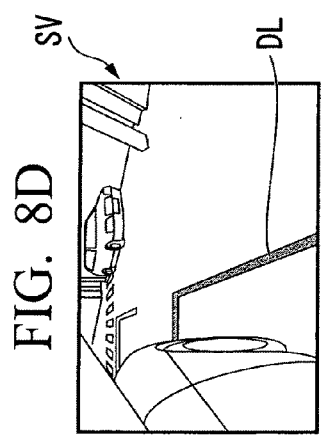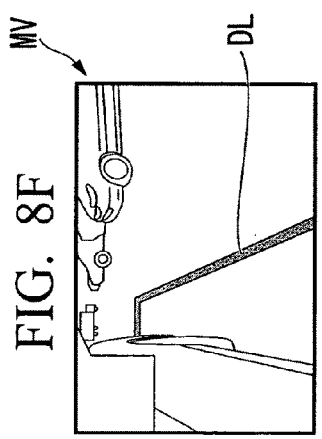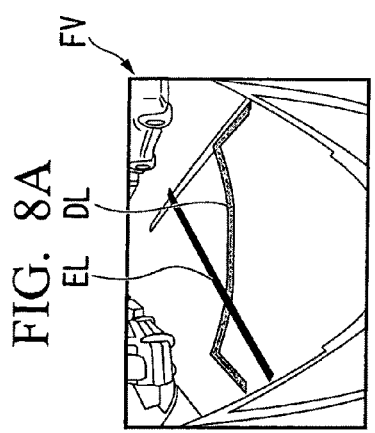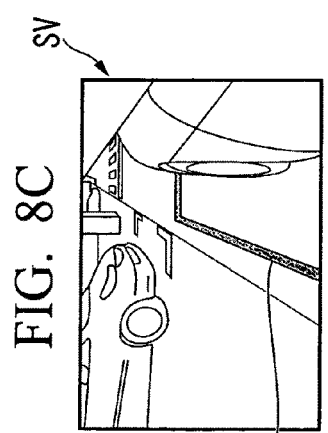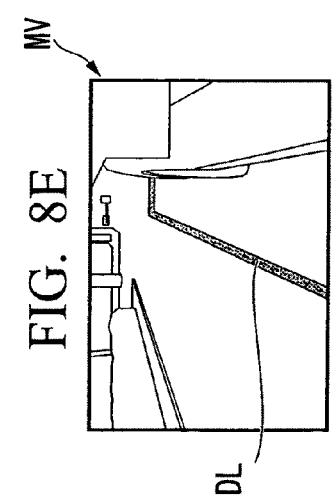

Please Directly Confirm Your Surroundings While Driving.

Please Directly Confirm Your Surroundings While Driving.

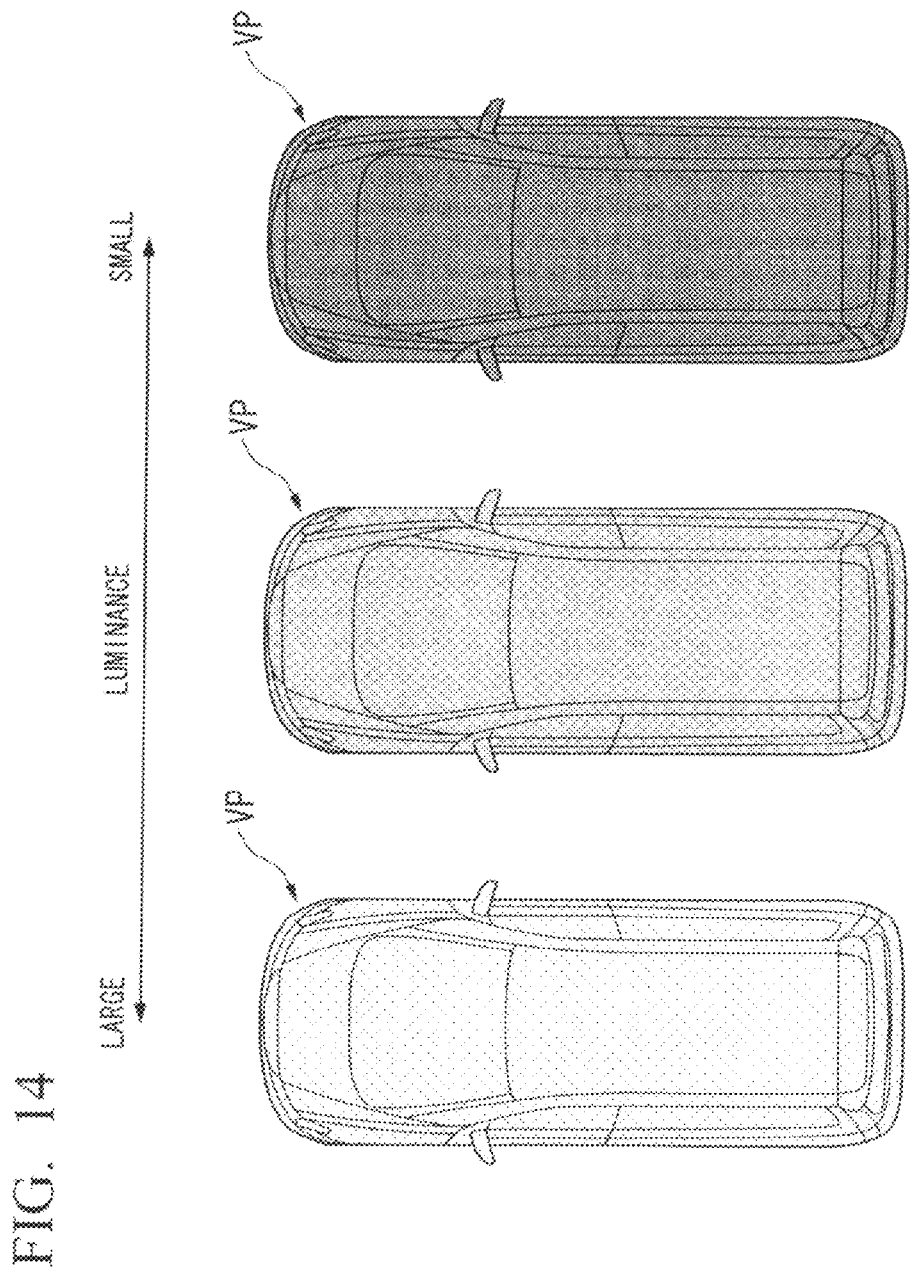

VEHICLE SURROUNDINGS MONITORING APPARATUS

BACKGROUND OF THE INVENTION

1. Field of the Invention

The present invention relates to a vehicle surroundings monitoring apparatus.

Priority is claimed on Japanese Patent Application No. 2008-236882, filed on Sep. 16, 2008, the content of which is incorporated herein by reference.

2. Description of Related Art

A vehicle periphery monitoring apparatus is known in which, when the display device displays images selected from captured images in multiple directions of the periphery of a vehicle, an identification image for identifying an imaging direction is superimposed on the selected images (for example, see Japanese Unexamined Patent Application, First Publication No. 2004-96359).

In the vehicle periphery monitoring apparatus which is an example of the conventional techniques, an identification image for identifying the imaging direction of a captured image which is actually displayed on the display screen is simply superimposed on the captured image. For this reason, there is a problem in that a driver cannot easily recognize which imaging direction can be selected for displaying the captured image.

SUMMARY OF THE INVENTION

The invention was conceived in view of the above-described circumstances, and it is an object thereof to provide a vehicle surroundings monitoring apparatus which enables a driver to easily recognize a display region in an external region of a vehicle corresponding to an image displayed on a display device and to easily recognize selectable display regions.

In order to achieve the above-described object, a vehicle surroundings monitoring apparatus of the invention, includes: a plurality of imaging units which capture an external region of a present-vehicle and output images; a display unit which is installed in an interior of the present-vehicle; a selector which selects an image to be displayed on the display unit from the images output from the imaging units; and a display control unit which displays the images output from the imaging units on the display unit so as to be switched in accordance with a selection by the selector and displays an image indicator display indicating a display region in the external region of the present-vehicle corresponding to the images so as to be switched by the selector on the display unit.

Moreover, it is preferable that, in the vehicle surroundings monitoring apparatus in the invention, the image indicator display be highlighted corresponding to the images displayed on the display unit in the display control unit.

Moreover, it is preferable that, in the vehicle surroundings monitoring apparatus in the invention, the image indicator display be disposed in an upper portion of the display unit.

According to the vehicle surroundings monitoring apparatus of the invention, the driver can easily recognize a display region in the external region of the present-vehicle corresponding to an image displayed on the display device and the selectable display regions for switching images.

BRIEF DESCRIPTION OF THE DRAWINGS

FIG. 8A is a diagram showing an example of converted images which are output from an image processing unit in the vehicle surroundings monitoring apparatus according to the embodiment of the invention.

FIG. 8B is a diagram showing an example of converted images which are output from an image processing unit in the vehicle surroundings monitoring apparatus according to the embodiment of the invention.

FIG. 8C is a diagram showing an example of converted images which are output from an image processing unit in the vehicle surroundings monitoring apparatus according to the embodiment of the invention.

FIG. 8D is a diagram showing an example of converted images which are output from an image processing unit in the vehicle surroundings monitoring apparatus according to the embodiment of the invention.

FIG. 8E is a diagram showing an example of converted images which are output from an image processing unit in the vehicle surroundings monitoring apparatus according to the embodiment of the invention.

FIG. 8F is a diagram showing an example of converted images which are output from an image processing unit in the vehicle surroundings monitoring apparatus according to the embodiment of the invention.

FIG. 8G is a diagram showing an example of converted images which are output from an image processing unit in the vehicle surroundings monitoring apparatus according to the embodiment of the invention.

FIG. 8H is a diagram showing an example of converted images which are output from an image processing unit in the vehicle surroundings monitoring apparatus according to the embodiment of the invention.

FIG. 14 is a diagram showing an example of a display state of a vehicle icon VP on a display screen in the vehicle surroundings monitoring apparatus according to the embodiment of the invention.

DETAILED DESCRIPTION OF THE INVENTION

A vehicle surroundings monitoring apparatus according to an embodiment of the invention will be described with reference to the accompanying drawings.

Figure 1:
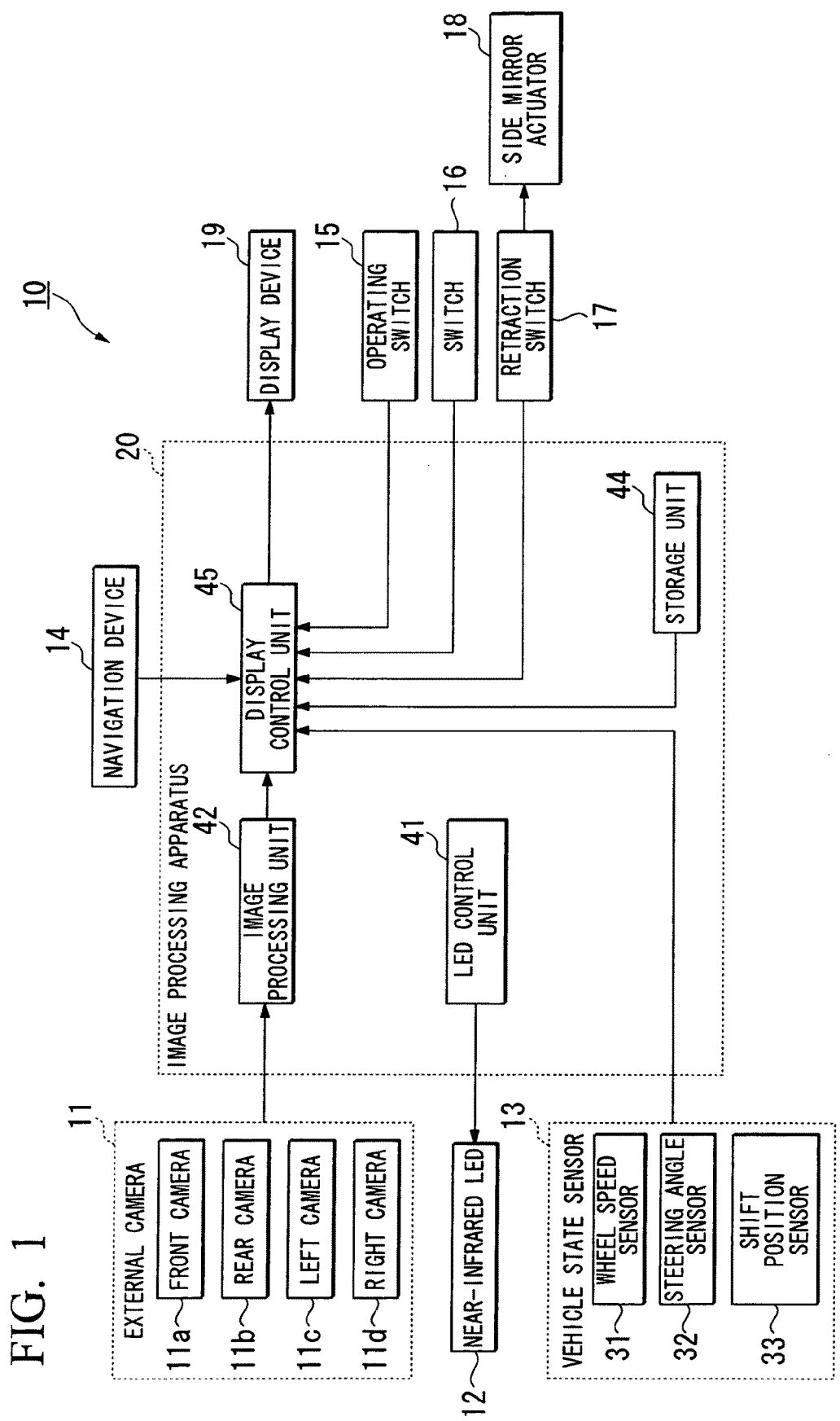
FIG. 1 is a configuration diagram of a vehicle surroundings monitoring apparatus according to an embodiment of the invention.

As shown in FIG. 1, a vehicle surroundings monitoring apparatus 10 according to the embodiment includes an external camera 11 (imaging unit), a near-infrared LED 12, a vehicle state sensor 13, a navigation device 14, an operating switch 15, a switch (selector) 16, a retraction switch 17, a side mirror actuator 18, a display device (display unit) 19, and an image processing apparatus 20. The display device 19 is installed in an interior of the vehicle. The image processing apparatus 20 has an electronic circuit including a CPU and the like. The vehicle surroundings monitoring apparatus 10 is installed in a vehicle and captures images of the external environment of the vehicle by the external camera 11.

Figure 2:
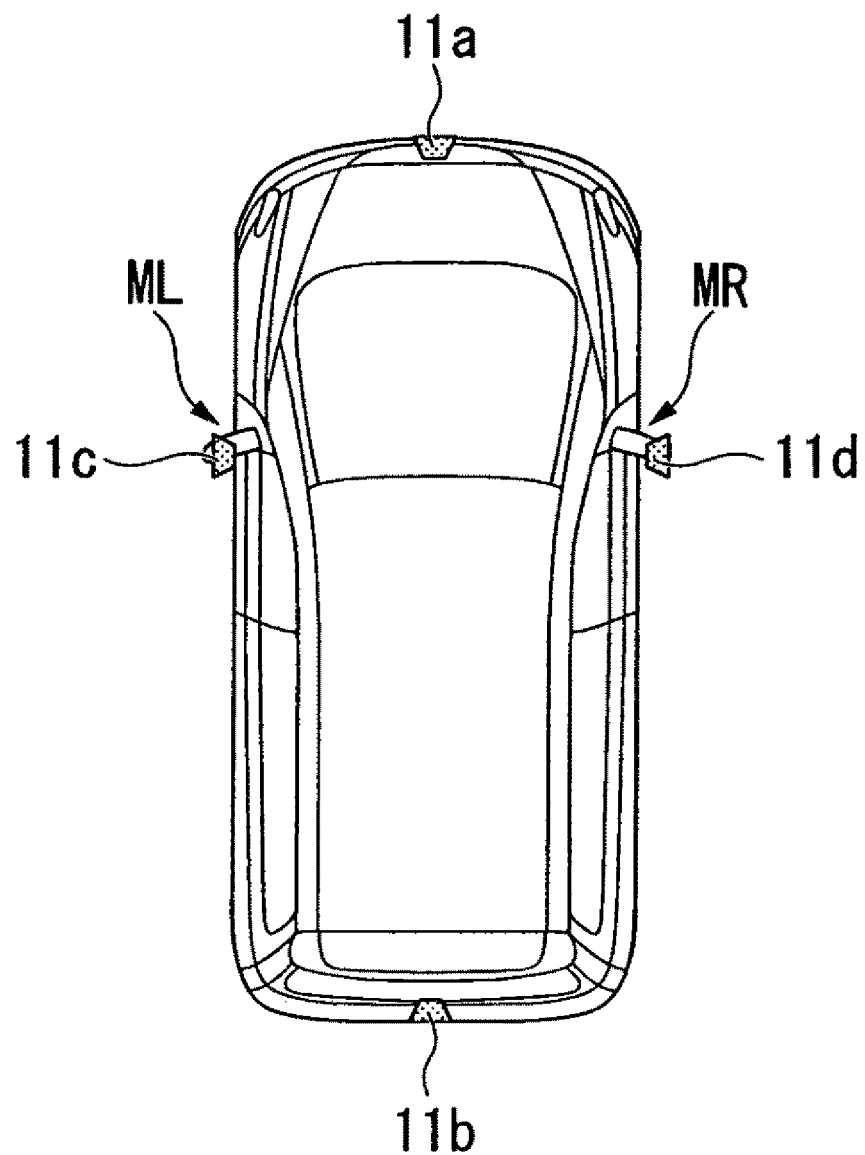
FIG. 2 is a diagram showing the arrangement of an external camera in the vehicle surroundings monitoring apparatus according to the embodiment of the invention.

As shown in FIG. 2, the external camera 11 includes a front camera 11a (imaging unit), a rear camera 11b (imaging unit), a left camera 11c (imaging unit), and a right camera 11d (imaging unit). The imaging region of the front camera 11a is a front peripheral region in the external environment of the vehicle. The imaging region of the rear camera 11b is a rear peripheral region in the external environment of the vehicle. The imaging regions of the left camera 11c and the right camera 11d are left and right peripheral regions in the external environment of the vehicle, respectively. The cameras 11a, 11b, 11c, and 11d can capture images from a visible-light region to a near-infrared region. The external camera 11 performs predetermined image processing, such as filtering, binarization, and the like on the images obtained by the cameras 11a, 11b, 11c, and 11d. The external camera 11 generates image data of pixels in a two-dimensional array and outputs the image data to the image processing apparatus 20.

The front camera 11a is installed at the front grille or the like of the vehicle. The rear camera 11b is installed at the backdoor, tailgate or the like of the vehicle. The left camera 11c and the right camera 11d are installed at the lower ends or the like of the left and right side mirrors ML and MR of the vehicle.

The near-infrared LED 12 is installed at the side mirror (for example, the left side mirror ML) and the like on the front passenger seat side of the vehicle. The near-infrared LED 12 is turned on or off under the control of the image processing apparatus 20 and irradiates a predetermined region on the front passenger seat side (for example, the imaging region of the external camera 11 on the front passenger seat side, that is, the peripheral region on the left side of the vehicle as the imaging region of the left camera 11c) in response to the lighting-up of the headlight (not shown) during nighttime or the like.

The vehicle state sensor 13 includes a wheel speed sensor 31, a steering angle sensor 32, a shift position sensor 33, and the like. The wheel speed sensor 31 detects, as a quantity for the vehicle state of the present-vehicle, the rotation speed (wheel speed) of the driving wheel and the like. The steering angle sensor 32 detects a steering angle (for example, the direction and degree of a steering angle input by a driver) or an actual steering angle (wheel turning angle) according to the steering angle. The shift position sensor 33 detects a shift position according to the state of a transmission mechanism (not shown) which is selected by the driver with a select lever (not shown).

The navigation device 14 carries out map matching processing on the basis of the current position of the vehicle and map data which are stored in advance. The navigation device 14 carries out processing such as route searching and route guidance with respect to a destination which is set in accordance with an input operation or the like by the operator, and outputs control commands which instruct the operations of the display device 19 and a speaker (not shown).

The operating switch 15 outputs various kinds of command signals depending on the operation selected by the driver, for example, instructions to select various kinds of menu items on the display screen of the display device 19.

The switch 16 outputs various kinds of command signals for display switching on the display screen of the display device 19 depending on the operation selected by the driver.

The retraction switch 17 outputs various kinds of command signals to the side mirror actuator 18 which carries out the retraction, extension, angle change, and the like of the left and right side mirrors ML and MR of the vehicle depending on the operation of the driver.

The display device 19 carries out various kinds of displays under the control of the image processing apparatus 20. For example, in addition to image data output from the external camera 11, the position of the present-vehicle and various kinds of guide displays can be displayed on the display screen of the display device 19 so as to be superimposed on the image data.

The image processing apparatus 20 includes, for example, an LED control unit 41, an image processing unit 42, a storage unit 44, and a display control unit 45.

The LED control unit 41 controls the turning on or off of the near-infrared LED 12 in response to the lighting-up of the headlight (not shown) during nighttime or the like and in response to a period in which an image of a side view SV described below is displayed on the display screen of the display device 19.

The image processing unit 42 generates and outputs converted images corresponding to a predetermined visual field display on the basis of image data output from the respective cameras 11a, 11b, 11c, and 11d of the external camera 11 by predetermined conversion processing.

Figure 3A:
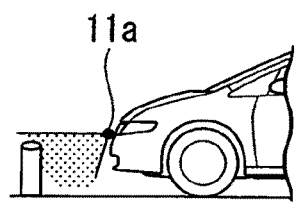
FIG. 3A is a diagram showing a predetermined external region corresponding to a visual field display in the vehicle surroundings monitoring apparatus according to the embodiment of the invention.
Figure 3B:
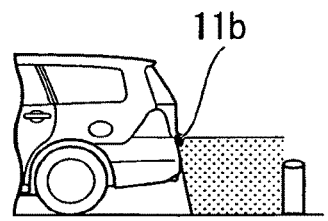
FIG. 3B is a diagram showing a predetermined external region corresponding to a visual field display in the vehicle surroundings monitoring apparatus according to the embodiment of the invention.
Figure 3C:
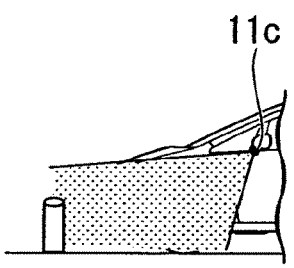
FIG. 3C is a diagram showing a predetermined external region corresponding to a visual field display in the vehicle surroundings monitoring apparatus according to the embodiment of the invention.
Figure 3D:
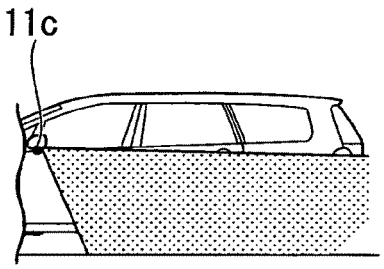
FIG. 3D is a diagram showing a predetermined external region corresponding to a visual field display in the vehicle surroundings monitoring apparatus according to the embodiment of the invention.
Figure 3E:
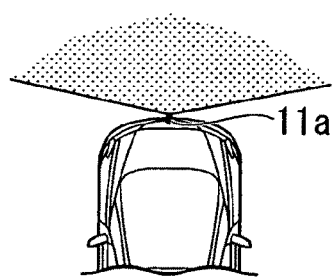
FIG. 3E is a diagram showing a predetermined external region corresponding to a visual field display in the vehicle surroundings monitoring apparatus according to the embodiment of the invention.
Figure 3F:
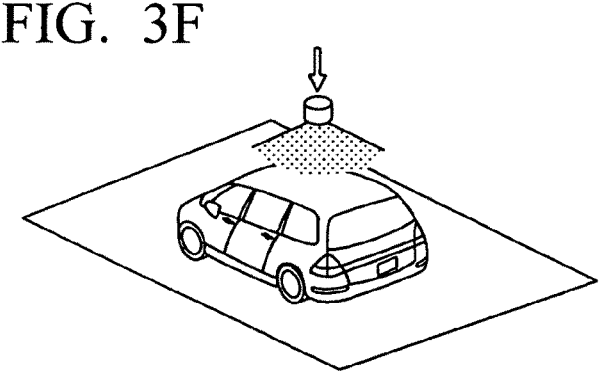
FIG. 3F is a diagram showing a predetermined external region corresponding to a visual field display in the vehicle surroundings monitoring apparatus according to the embodiment of the invention.

The predetermined visual field display includes, for example, display (front view FV) of the front region of the vehicle shown in FIG. 3A, display (rear view RV) of the rear region of the vehicle shown in FIG. 3B, display (side view SV) of the left and right front regions of the vehicle shown in FIG. 3C, display (mirror view MV) of the left and right rear regions of the vehicle shown in FIG. 3D in which the regions reflected in the left and right side mirrors ML and MR are virtually reproduced, display (front blind view FBV) shown in FIG. 3E in which the display region is expanded left and right in the front region of the vehicle, display (ground view GV) of an overhead view of the peripheral region of the vehicle shown in FIG. 3F, and the like.

Figure 4:
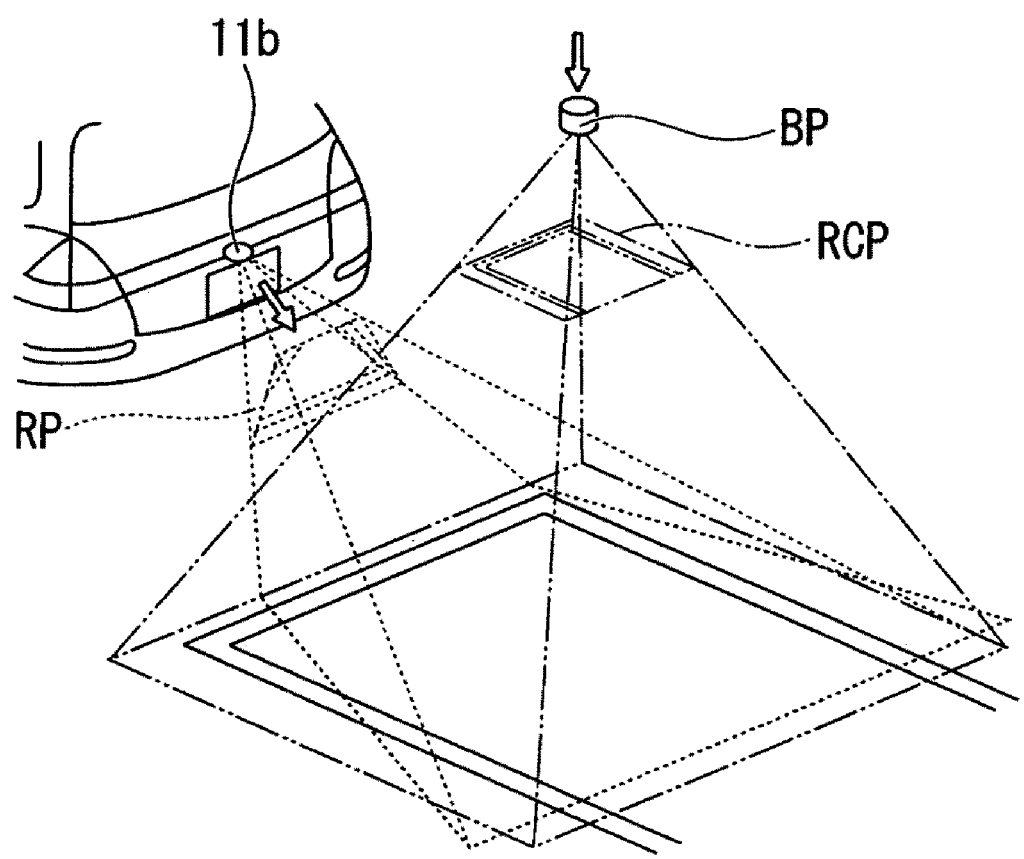
FIG. 4 is a diagram showing examples of image data RP obtained by a rear camera in the vehicle surroundings monitoring apparatus according to the embodiment of the invention and converted image data RCP obtained by viewpoint conversion with respect to the image data RP.
Figure 5A:
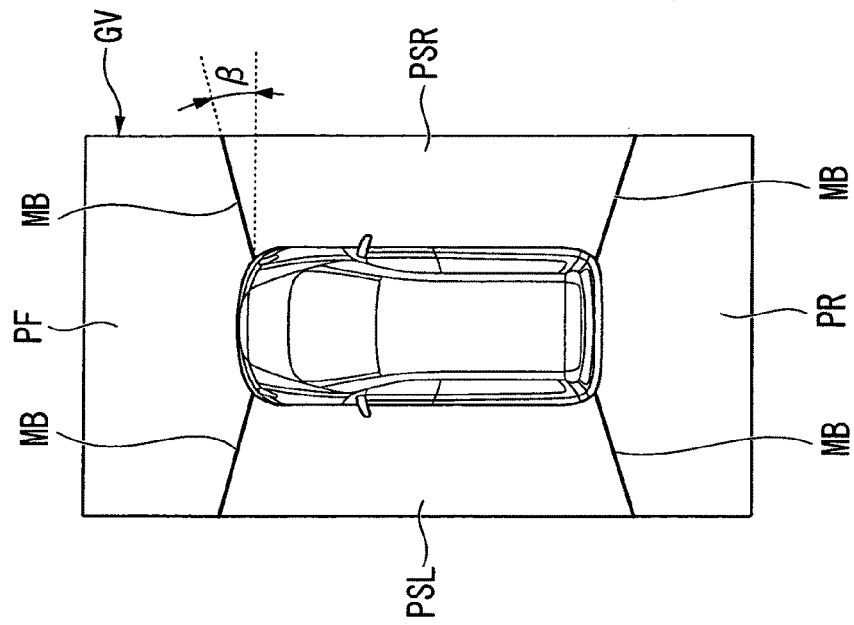
FIG. 5A is a diagram showing an image of a ground view GV corresponding to the extension of left and right side mirrors ML and MR in the vehicle surroundings monitoring apparatus according to the embodiment of the invention.
Figure 5B:
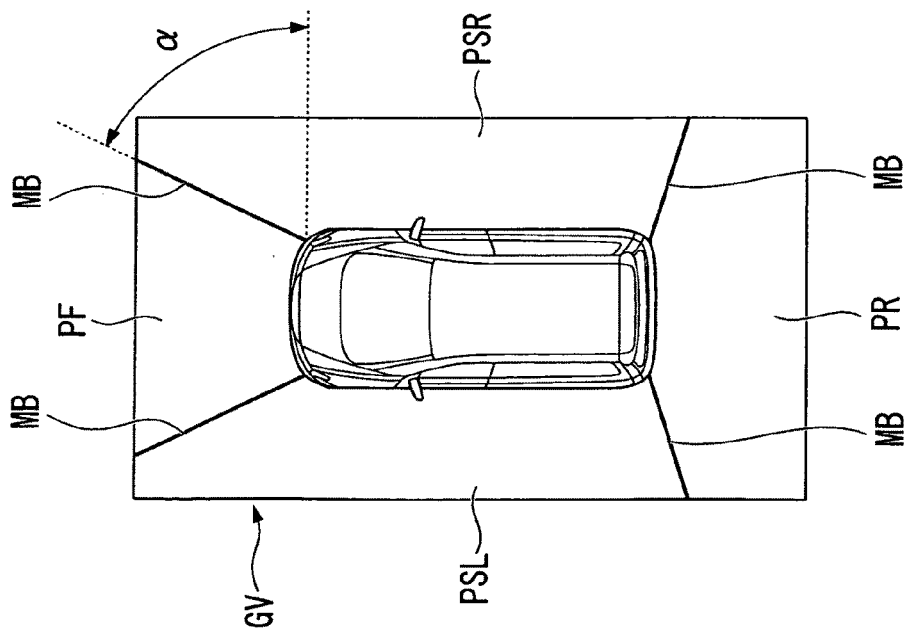
FIG. 5B is a diagram showing an image of a ground view GV according to the retraction of left and right side mirrors ML and MR in the vehicle surroundings monitoring apparatus according to the embodiment of the invention.
Figure 6A:
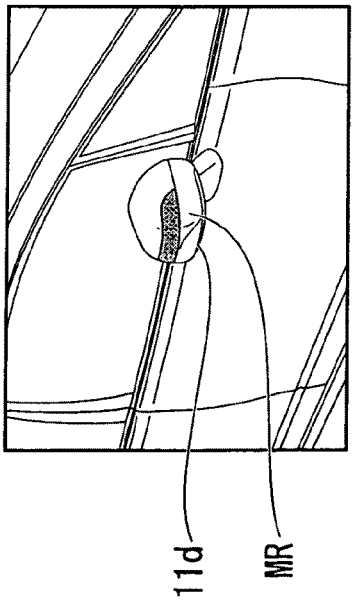
FIG. 6A is a diagram showing the extended state of a right side mirror MR in the vehicle surroundings monitoring apparatus according to the embodiment of the invention.
Figure 6B:
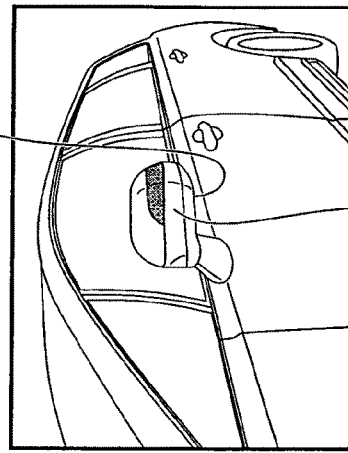
FIG. 6B is a diagram showing the extended n state of a left side mirror ML in the vehicle surroundings monitoring apparatus according to the embodiment of the invention.
Figure 6C:
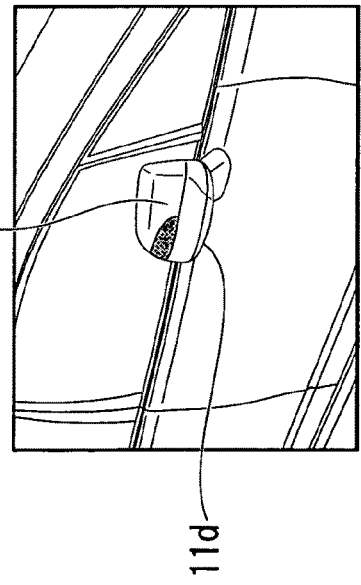
FIG. 6C is a diagram showing the retracted state of a right side mirror MR in the vehicle surroundings monitoring apparatus according to the embodiment of the invention.
Figure 6D:
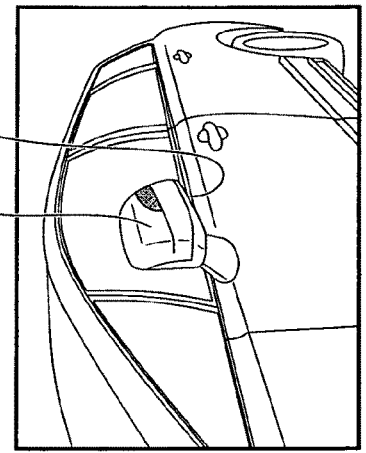
FIG. 6D is a diagram showing the retracted state of a left side mirror ML in the vehicle surroundings monitoring apparatus according to the embodiment of the invention.

When generating the image of the ground view GV, as shown in FIG. 4, the image processing unit 42 carries out viewpoint conversion on image data of the imaging regions of the respective cameras 11a, 11b, 11c, and 11d (for example, image data RP of the rear region of the vehicle shown in FIG. 4) while correcting image distortion or the like so as to provide images as viewed downward from a predetermined viewpoint BP above the vehicle in the vertical direction (for example, a converted image RCP shown in FIG. 4). An image in a predetermined field angle range for each converted image (for example, a front extracted image PF, a rear extracted image PR, a left extracted image PSL, or a right extracted image PSR) is extracted from each of the converted images obtained by the conversion processing such that the boundary positions thereof match each other. Then, as shown in FIGS. 5A and 5B, the images (the extracted images PF, PR, PSL, and PSR) are combined to generate a combined image, and the combined image is output as the image of the ground view GV. In the combined image, a predetermined mask line MB is provided at the boundary between adjacent extracted images.

When the left camera 11c and the right camera 11d of the external camera 11 are respectively provided at the lower ends of the left and right side mirrors ML and MR of the vehicle, the imaging regions of the left camera 11c and the right camera 11d change depending on the opening/closing of the left and right side mirrors ML and MR (that is, extension and retraction). For this reason, the image processing unit 42 changes the contents of the viewpoint conversion processing in accordance with the extension and retraction of the left and right side mirrors ML and MR and also changes a predetermined field angle range for each converted image (that is, the extraction ranges for extracting the extracted images PF, PR, PSL, and PSR from the respective converted images). The image of the ground view GV is generated which displays the same predetermined peripheral region by changing the boundary position between the images constituting the combined image (that is, the extracted images PF, PR, PSL, and PSR), regardless of the extension and retraction of the left and right side mirrors ML and MR.

As shown in FIGS. 6A to 6D, when the left and right side mirrors ML and MR in the extended state are retracted, the ends of the side mirrors ML and MR are moved upward in the vertical direction, so the inclination angles of the side mirrors ML and MR with respect to the horizontal direction may be changed. The cameras 11c and 11d are set to capture the images of only the peripheral regions on the left and right sides of the vehicle in the extended state of the left and right side mirrors ML and MR. However, the imaging regions of the cameras 11c and 11d unnecessarily include the left and right portions of the vehicle main body and are shifted to the rear side of the vehicle in the retracted state of the left and right side mirrors ML and MR.

Figure 7A:
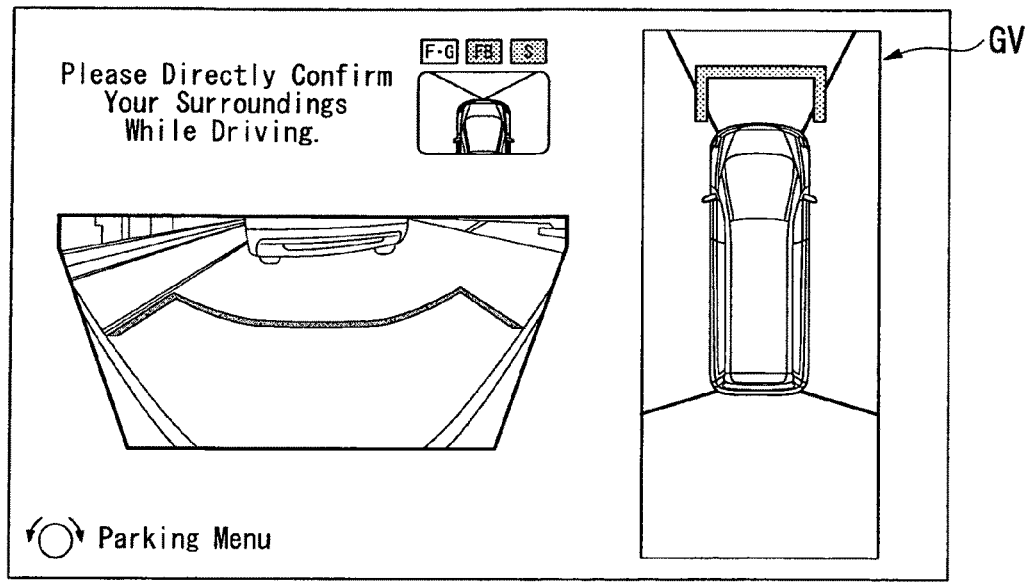
FIG. 7A is an image of a ground view GV in the extended state of left and right side mirrors ML and MR in the vehicle surroundings monitoring apparatus according to the embodiment of the invention.
Figure 7B:
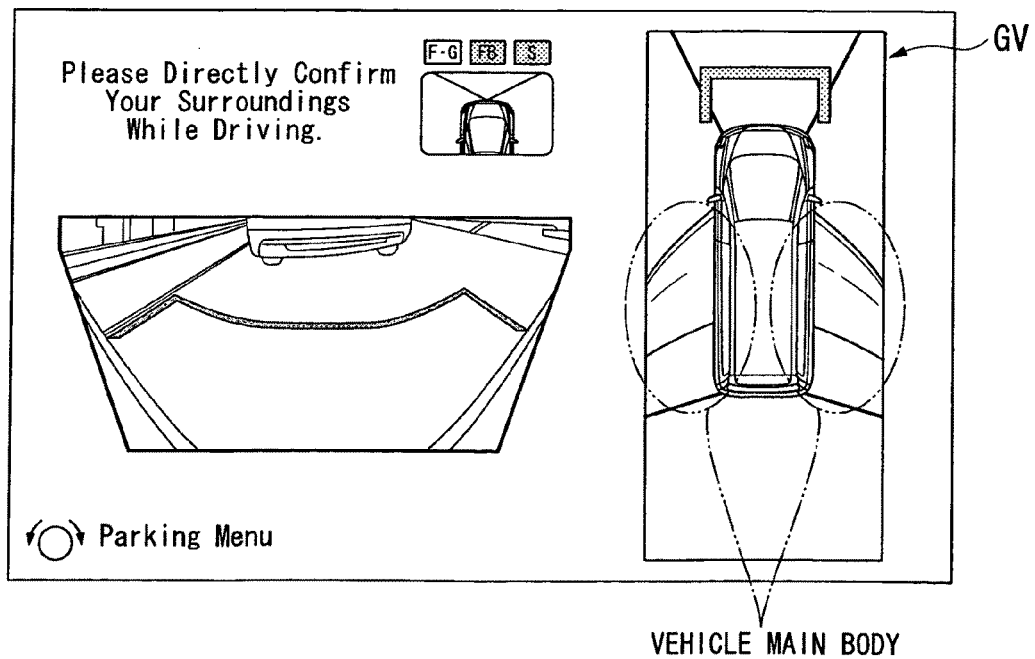
FIG. 7B is an image of a ground view GV in the retracted state of left and right side mirrors ML and MR in the vehicle surroundings monitoring apparatus according to a comparative example of the embodiment of the invention.

Accordingly, if the image of the ground view GV in the retracted state of the left and right side mirrors ML and MR (for example, the image of the ground view GV in the retracted state shown in FIG. 7B) is generated by the same processing (that is, the same viewpoint conversion processing, and the processing for aligning the extraction ranges for extracting the extracted images PSL and PSR and the boundary positions between the extracted images PF, PR, PSL, and PSR constituting the combined image) as the processing for generating the image of the ground view GV in the extended state of the left and right side mirrors ML and MR (for example, the image of the ground view GV in the extended state shown in FIG. 7A), an appropriate image as viewed downward from a predetermined viewpoint BP may not be obtained. Further, the predetermined peripheral regions on the left and right sides of the vehicle may not be displayed, and the boundary positions may be misaligned with respect to other extracted images PF and PR constituting the combined image.

For this reason, the image processing unit 42 first changes the contents of the viewpoint conversion processing in accordance with the extension and retraction of the left and right side mirrors ML and MR. The image processing unit 42 also changes the predetermined field angle range for each converted image (that is, the extraction ranges for extracting the extracted images PF, PR, PSL, and PSR from the respective converted images). Thus, appropriate extracted images PSL and PSR are extracted which display the same predetermined peripheral regions on the left and right sides of the vehicle as viewed downward from a predetermined viewpoint BP, regardless of the extension and retraction of the left and right side mirrors ML and MR.

The imaging regions of the cameras 11c and 11d in the retracted state of the left and right side mirrors ML and MR may be shifted to the rear side of the vehicle compared to the extended state of the left and right side mirrors ML and MR, so a region that cannot be imaged may be generated. With regard to this region, the boundary positions between the front extracted image PF, the left extracted image PSL, and the right extracted image PSR are especially shifted to the rear side of the vehicle in the retracted state of the left and right side mirrors ML and MR as shown in FIG. 5B compared to the extended state of the left and right side mirrors ML and MR shown in FIG. 5A. In this way, the boundary positions between the extracted images PF, PSL, and PSR in the combined image are changed. In response to the change in the boundary positions, the extraction ranges for extracting the extracted images PF, PR, PSL, and PSR from the respective converted images are changed in advance.

In the extended state of the left and right side mirrors ML and MR shown in FIG. 5A, the mask line MB which indicates each boundary position between the front extracted image PF, the left extracted image PSL, and the right extracted image PSR is inclined forward at a first predetermined angle α with respect to the left-right direction of the vehicle. Meanwhile, in the retracted state of the left and right side mirrors ML and MR shown in FIG. 5B, the mask line MB which indicates each boundary position between the front extracted image PF, the left extracted image PSL, and the right extracted image PSR is inclined forward at a second predetermined angle β(<α) smaller than the first predetermined angle α with respect to the left-right direction of the vehicle. Thus, the extraction region of the front extracted image PF is expanded and the extraction regions of the left extracted image PSL and the right extracted image PSR are reduced in the retracted state compared to the extended state of the left and right side mirrors ML and MR.

The image processing unit 42 outputs, for example, the converted images of a front view FV shown in FIG. 8A, a rear view RV shown in FIG. 8B, left and right side views SV shown in FIGS. 8C and 8D, left and right mirror views MV shown in FIGS. 8E and 8F, a front blind view FBV shown in FIG. 8G, and a ground view GV shown in FIG. 8H.

The display control unit 45 displays a navigation screen according to various kinds of operations of the navigation device 14 on the display screen of the display device 19.

The display control unit 45 displays the converted images on the display screen of the display device 19 by a predetermined combination set in advance, a predetermined combination according to command signals output from the operating switch 15 or the switch 16, or a predetermined combination according to detection signals output from the vehicle state sensor 13.

When displaying the converted images output from the image processing unit 42 on the display screen of the display device 19, the display control unit 45 acquires various kinds of messages and images stored in the storage unit 44 and displays the messages or images on the display screen of the display device 19. At the same time, various kinds of guide displays for assisting the driving of the driver (for example, an indicator guide line DL concerning a predetermined position at the periphery of the vehicle shown in FIGS. 8A to 8F and 8H, an expected guide line EL concerning the traveling trace of the vehicle shown in the FIGS. 8A and 8H, and the like) are displayed so as to be superimposed on the converted images.

Figure 9A:
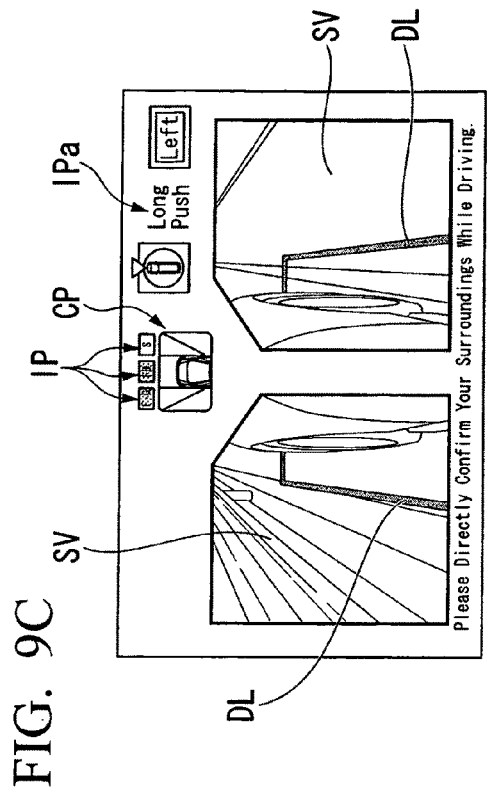
FIG. 9A is a diagram showing an example of a display screen in the vehicle surroundings monitoring apparatus according to the embodiment of the invention.

It is assumed that the speed of the vehicle (vehicle speed) according to the detection signal output from the wheel speed sensor 31 of the vehicle state sensor 13 is equal to or lower than a predetermined low side determination threshold value VthL, and the shift position in the detection signal output from the shift position sensor 33 is in a position (for example, a drive position for forward movement or the like) other than the reverse position for backward movement. In this case, the display control unit 45 selects four display modes, a display mode based on the combination of a front view FV and a ground view GV shown in FIG. 9A, a display mode based on a front blind view FBV shown in FIG. 9B, a display mode based on the combination of left and right side views SV shown in FIG. 9C, and a display mode based on a left side view SV shown in FIG. 9D, from among a plurality of display modes set in advance. The display control unit 45 displays one of the display modes on the display screen of the display device 19 so as to be switched in accordance with a command signal output from the switch 16.

In this case, in addition to the converted images output from the image processing unit 42, the display control unit 45 acquires display mode indication images (image indicator display) IP, an imaging region indication image CP, various kinds of messages (for example, "Please Directly Confirm Your Surroundings While Driving." and the like), menu display, help display, and the like from the storage unit 44, and displays them on the display screen of the display device 19. The display mode indication images IP displayed on the display screen represent switchable display modes. The display mode indicator images IP is disposed in an upper portion of the display device 19. Therefore, the driver can recognize the display mode indicator images IP more clearly. The imaging region indication image CP displayed on the display screen schematically shows the imaging region of the external camera 11 corresponding to a converted image being displayed.

The display mode indication images IP include, as switchable display modes, an image (F-G) representing the combination of the front view FV and the ground view GV, an image (FB) representing the front blind view FBV, an image (S) representing the combination of the left and right side views SV or only the left side view SV, an image (R-G) representing the combination of the rear view RV and the ground view GV, and an image (R-M) representing the combination of the rear view RV and the left and right mirror views MV. As shown in FIGS. 9A to 9D, the display mode indication image IP corresponding to a display mode being displayed on the display screen of the display device 19 is highlighted by increasing the contrast or size, or by changing the display color with respect to the display mode indication images IP corresponding to other switchable display modes.

Figure 9C:
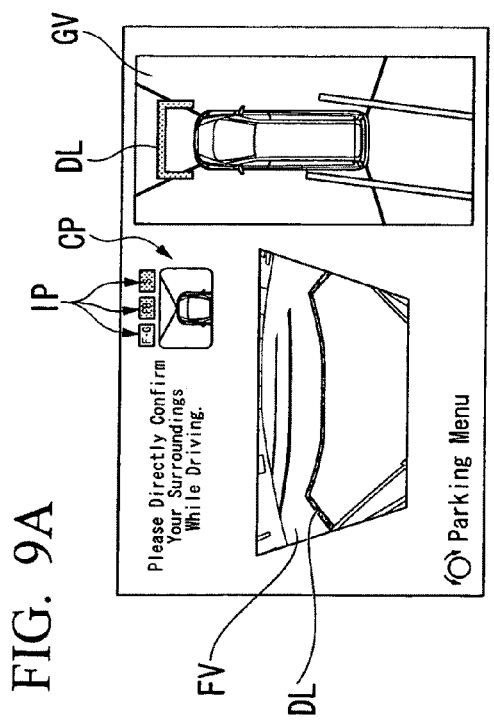
FIG. 9C is a diagram showing an example of a display screen in the vehicle surroundings monitoring apparatus according to the embodiment of the invention.
Figure 9B:
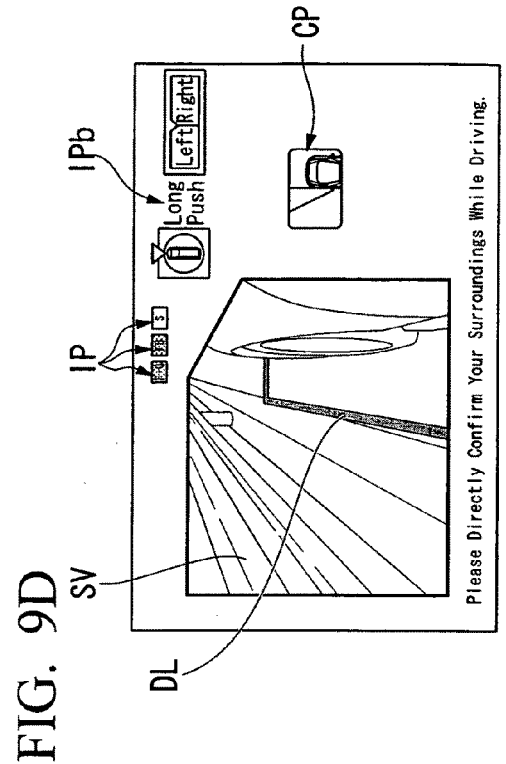
FIG. 9B is a diagram showing an example of a display screen in the vehicle surroundings monitoring apparatus according to the embodiment of the invention.
Figure 9D:
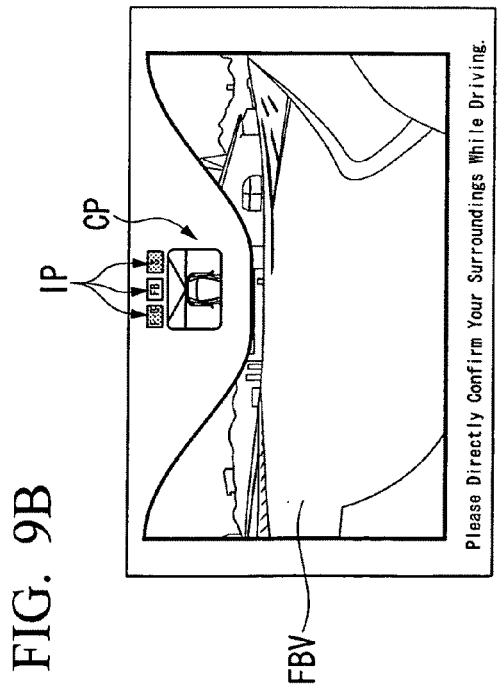
FIG. 9D is a diagram showing an example of a display screen in the vehicle surroundings monitoring apparatus according to the embodiment of the invention.

As shown in FIGS. 9C and 9D, when the image (S) representing the combination of the left and right side views SV or only the left side view SV is displayed and highlighted as the display mode indication image IP, the display control unit 45 displays a first auxiliary display mode indication image (image indicator display) IPa or a second auxiliary display mode indication image (image indicator display) IPb which indicates a mutually switchable display mode (that is, the display mode based on the combination of the left and right side views SV or the display mode based only on the left side view SV).

The first auxiliary display mode indication image IPa (long push: left) indicates that when the operating switch 15 is pushed for a long time, the display mode based on the combination of the left and right side views SV can be switched to the display mode based only on the left side view SV. The second auxiliary display mode indication image IPb (long push: left/right) indicates that when the operating switch 15 is pushed for a long time, the display mode based only on the left side view SV can be switched to the display mode based on the combination of the left and right side views SV.

With regard to the combination of the front view FV and the ground view GV, the display control unit 45 displays the image of the front view FV and the image of the ground view GV on the display screen of the display device 19 so as to be arranged in the left-right direction, as shown in FIG. 9A.

With regard to the combination of the rear view RV and the ground view GV, the image of the rear view RV and the image of the ground view GV are displayed on the display screen of the display device 19 so as to be arranged in the left-right direction.

With regard to the combination of the left and right side views SV, as shown in FIG. 9C, the image of the left side view SV and the image of the right side view SV are displayed on the display screen of the display device 19 so as to be arranged in the left-right direction.

Figure 10A:
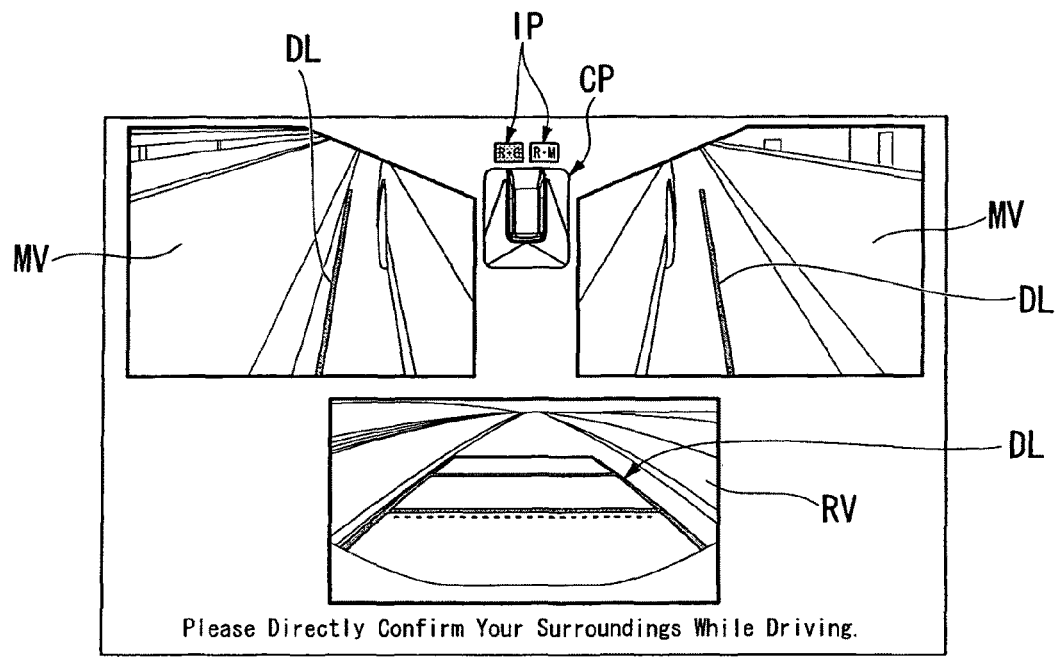
FIG. 10A is a diagram showing an example of a display screen in the vehicle surroundings monitoring apparatus according to the embodiment of the invention.
Figure 10B:
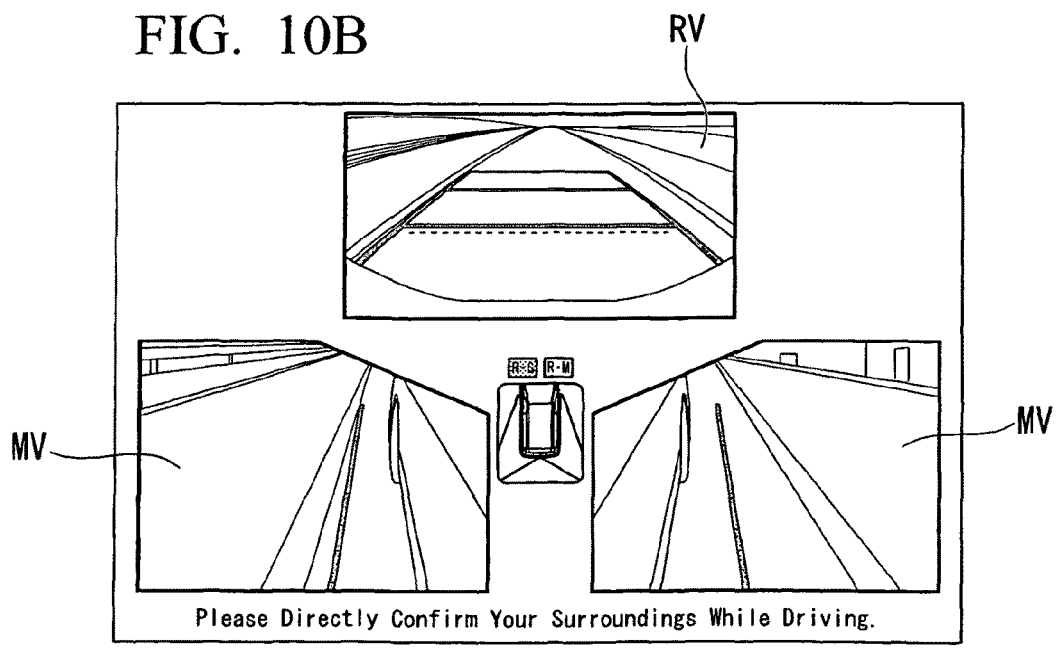
FIG. 10B is a diagram showing an example of a display screen in the vehicle surroundings monitoring apparatus according to the embodiment of the invention.

When the shift position in the detection signal output from the shift position sensor 33 is in the reverse position (the vehicle is engaged in a reverse gear), the combination of the rear view RV and the left and right mirror views MV is selected. As shown in FIG. 10A, on the display screen of the display device 19, the image of the left mirror view MV and the image of the right mirror view MV are arranged in the left-right direction at the upper space, and the rear view RV is arranged at the lower space. In this case, as shown in FIG. 10B, the discomfort that the driver may feel with respect to the display mode can be suppressed, and visibility can be improved, as compared with a case where the image of the rear view RV is arranged at the upper space and the images of the left and right mirror views MV are arranged at the lower space.

The image of the ground view GV which is combined with the front view FV at the time of the forward movement of the vehicle and the image of the ground view GV which is combined with the rear view RV at the time of the backward movement of the vehicle are the same (that is, the same display mode in which the field angle ranges of the extracted images PF, PR, PSL, and PSR constituting the image of the ground view GV, the boundary positions between the extracted images, and the like are unchanged).

Figure 11A:
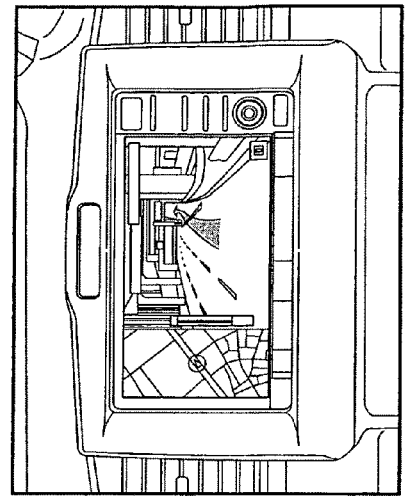
FIG. 11A is a diagram showing an example of a display screen immediately after the starting of a vehicle in the vehicle surroundings monitoring apparatus according to the embodiment of the invention.
Figure 11B:
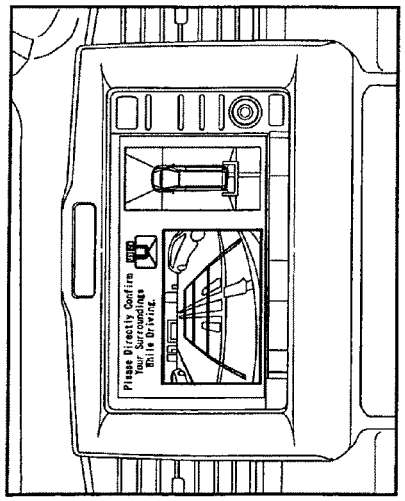
FIG. 11B is a diagram showing an example of a display screen after a predetermined time has passed from the starting of a vehicle in the vehicle surroundings monitoring apparatus according to the embodiment of the invention.
Figure 11C:
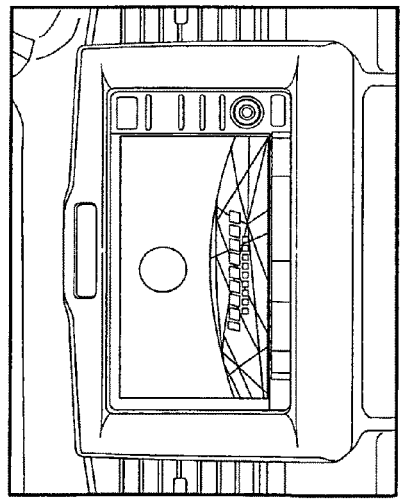
FIG. 11C is a diagram showing an example of a display screen immediately after the starting of a vehicle in the vehicle surroundings monitoring apparatus according to a comparative example of the embodiment of the invention.

When the ignition switch of the vehicle is turned on and the vehicle is started, the time which it takes to activate the external camera 11 and the image processing apparatus 20 is relatively shorter than the time which it takes to activate the navigation device 14. For this reason, while the navigation device 14 is being activated, as shown in FIG. 11A, the display control unit 45 selects the display mode based on the combination of the front view FV or the rear view RV and the ground view GV and automatically displays on the display screen of the display device 19. After the navigation device 14 is activated, as shown in FIG. 11B, the display mode is switched to a predetermined navigation screen. Thus, it is possible to appropriately assist the driver to be aware of vehicle surroundings when the vehicle starts moving, without needing the driver to switch the display screen, as compared with a case where a predetermined activation screen shown in FIG. 11C is automatically displayed on the display screen of the display device 19 while the navigation device 14 is being activated.

When the left camera 11c and the right camera 11d of the external camera 11 are installed at the lower ends of the left and right side mirrors ML and MR of the vehicle, the display control unit 45 stops display of the images of the left and right side views SV and the left and right mirror views MV in the retracted state of the left and right side mirrors ML and MR. Further, a predetermined mask image MP covering the display regions of the respective images and a predetermined message (for example, "Side Mirrors in Retracted State/Not Displayed" or the like) are displayed to indicate that display based on image data output from the left camera 11c and the right camera 11d in the retracted state of the left and right side mirrors ML and MR has been stopped.

Figure 12A:
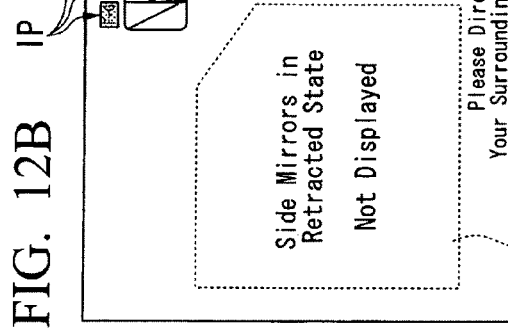
FIG. 12A is a diagram showing an example of a display screen in the retracted state of left and right side mirrors ML and MR in the vehicle surroundings monitoring apparatus according to the embodiment of the invention.

As shown in FIG. 12A, the images of the ground view GV, the front view FV, and the rear view RV are displayed on the display screen of the display device 19, regardless of the extension and retraction of the left and right side mirrors ML and MR. Meanwhile, as shown in FIGS. 12B and 12C, display based on the images of the left side view SV and the right side view SV is stopped in the retracted state of the left and right side mirrors ML and MR, and a predetermined mask image MP covering the display regions of the respective images is displayed.

Figure 12B:
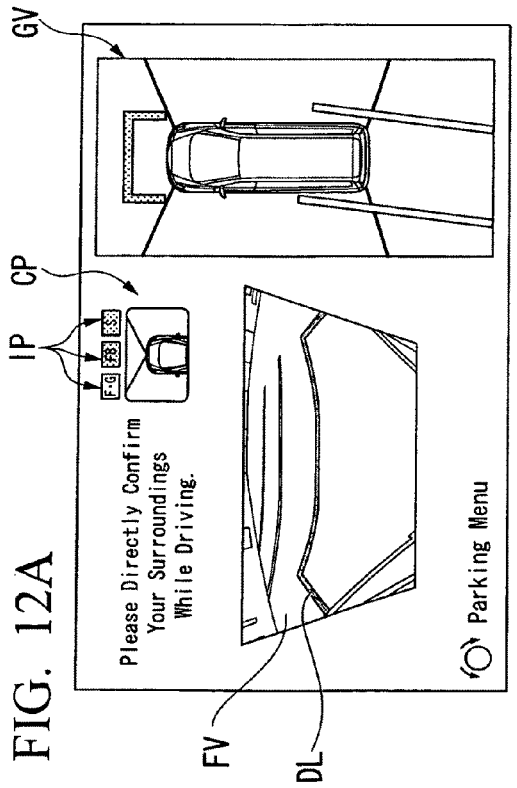
FIG. 12B is a diagram showing an example of a display screen in the retracted state of left and right side mirrors ML and MR in the vehicle surroundings monitoring apparatus according to the embodiment of the invention.
Figure 12C:
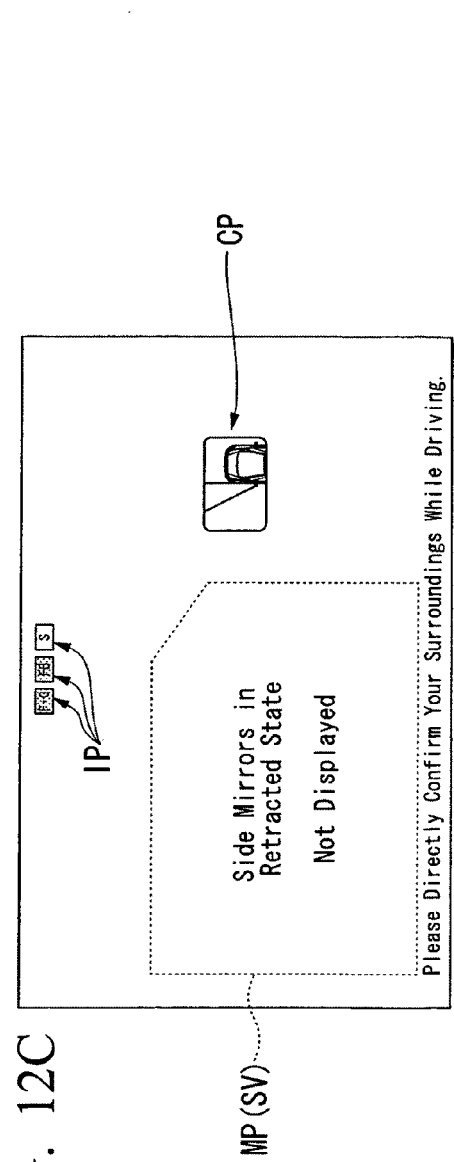
FIG. 12C is a diagram showing an example of a display screen in the retracted state of left and right side mirrors ML and MR in the vehicle surroundings monitoring apparatus according to the embodiment of the invention.

As shown in FIGS. 12A to 12C, even though the image (FB) representing the front blind view FBV is displayed as the display mode indication image IP, switching to the display mode based on the front blind view FBV is inhibited in the retracted state of the left and right side mirrors ML and MR.

In the retracted state of the left and right side mirrors ML and MR, for example, as shown in FIGS. 12B and 12C, display of the first auxiliary display mode indication image IPa and the second auxiliary display mode indication image IPb which individually indicate the display mode based on the combination of the left and right side views SV and the display mode based only on the left side view SV is stopped.

As described above, in the retracted state of the left and right side mirrors ML and MR, with regard to the image of the ground view GV, the contents of the viewpoint conversion processing, the predetermined field angle range for each converted image, and the boundary positions between the extracted images PF, PR, PSL, and PSR are changed.

As described below, the display control unit 45 switches between display of the converted images output from the image processing unit 42 (display of a multi-view screen) and a display of a navigation screen concerning various kinds of operations of the navigation device 14 automatically or in accordance with the command signals output from the switch 16.

Especially, when switching display of the navigation screen to display of the multi-view screen in accordance with the command signal output from the switch 16, the display control unit 45 determines whether or not the vehicle speed according to the detection signal output from the wheel speed sensor 31 of the vehicle state sensor 13 is equal to or lower than a predetermined low side determination threshold value VthL (for example, 12 km/h or the like). When the vehicle speed is higher than the predetermined low side determination threshold value VthL, a predetermined set screen shown in FIGS. 13A to 13D is displayed until the vehicle speed becomes equal to or lower than the predetermined low side determination threshold value VthL.

The set screen which is displayed when the vehicle speed is higher than the predetermined low side determination threshold value VthL has the same screen layout as the multi-view screen which is displayed when the vehicle speed becomes equal to or lower than the predetermined low side determination threshold value VthL. In this case, when the vehicle speed is equal to or lower than the predetermined low side determination threshold value VthL, and the multi-view screen corresponding to the display mode based on the combination of the front view FV and the ground view GV is displayed, the set screen is displayed which has the same screen layout as the display mode based on the combination of the front view FV and the ground view GV.

On the set screen, a predetermined mask image MP is displayed which covers the display regions of the respective images in respective visual field display (that is, the front view FV, the rear view RV, the side view SV, the mirror view MV, the front blind view FBV, and the ground view GV). Further, a predetermined message (for example, "Not Displayed" or the like) is displayed to indicate that display based on image data output from the cameras 11*a*, 11*b*, 11*c*, and 11*d* of the external camera 11 has been stopped. On the set screen, a predetermined message (for example, "Be Displayed at 12 km/h or Lower" or the like) is also displayed to indicate that display based on image data output from the cameras 11*a*, 11*b*, 11*c*, and 11*d* of the external camera 11 will be made (that is, the multi-view screen is displayed) when the vehicle speed becomes equal to or lower than the predetermined low side determination threshold value VthL.

Figure 13A:
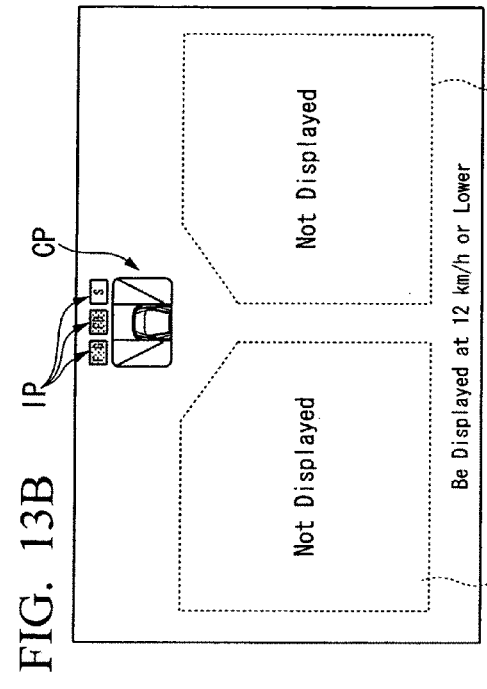
FIG. 13A is a diagram showing an example of a set screen of a display screen in the vehicle surroundings monitoring apparatus according to the embodiment of the invention.
Figure 13B:
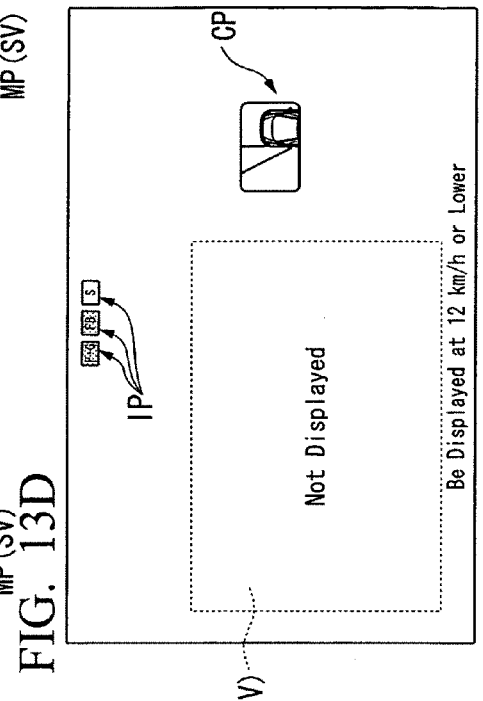
FIG. 13B is a diagram showing an example of a set screen of a display screen in the vehicle surroundings monitoring apparatus according to the embodiment of the invention.
Figure 13C:
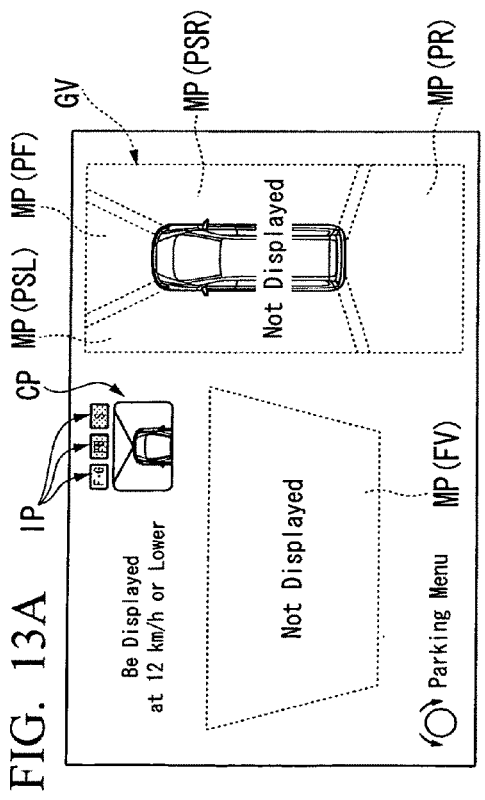
FIG. 13C is a diagram showing an example of a set screen of a display screen in the vehicle surroundings monitoring apparatus according to the embodiment of the invention.
Figure 13D:
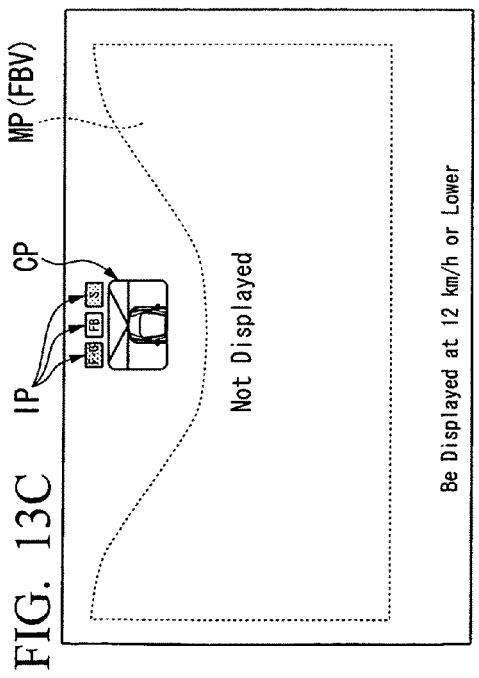
FIG. 13D is a diagram showing an example of a set screen of a display screen in the vehicle surroundings monitoring apparatus according to the embodiment of the invention.

On the set screen, as shown in FIGS. 13B and 13D, display of the first and second auxiliary display mode indication images IPa and IPb which individually indicate the display mode based on the combination of the left and right side views SV and the display mode based only on the left side view SV is stopped.

A vehicle image (vehicle icon) VP is displayed on the image of the ground view GV on the multi-view screen and on the set screen or the like which has the same screen layout as the display mode having the ground view GV.

The display control unit 45 appropriately changes the display state (for example, luminance or color) of the vehicle image (vehicle icon) VP between a plurality of different display states shown in FIG. 14 in accordance with the lighting state of the headlight (not shown) or the near-infrared LED 12, the brightness of other images on the display screen, the presence/absence of the mask image MP, or the like.

With regard to the image of the ground view GV on the multi-view screen, when the headlight (not shown) is turned on, a vehicle icon VP, for example, with relatively large luminance is displayed. When the headlight (not shown) is turned off, a vehicle icon VP with relatively little luminance is displayed. On the set screen, the vehicle icon VP with least luminance is displayed.

The vehicle surroundings monitoring apparatus 10 of the embodiment has the above-described configuration. Next, the operation of the vehicle surroundings monitoring apparatus 10, especially, the switching operation of the display screen by the display control unit 45 will be described.

Figure 15:
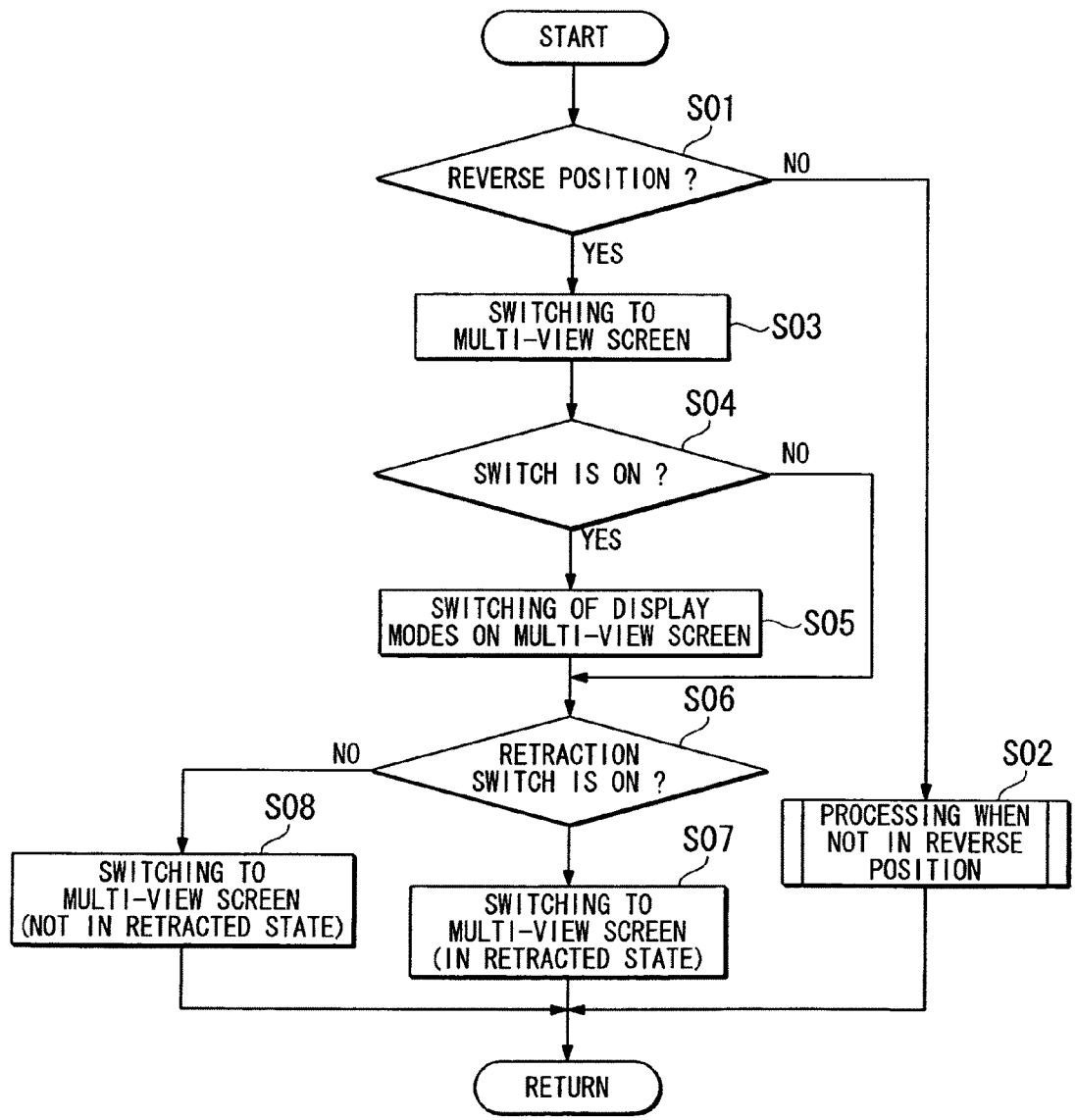
FIG. 15 is a flowchart showing the operation of the vehicle surroundings monitoring apparatus according to the embodiment of the invention.

In Step S01 of FIG. 15, it is determined whether or not the shift position in the detection signal output from the shift position sensor 33 is in the reverse position for backward movement.

When the determination result is "YES", the process progresses to Step S03 described below.

When the determination result is "NO", the process progresses to Step S02. In Step S02, a below-described processing in a shift position except for the reverse position is carried out (the vehicle is engaged in a gear other than reverse), and then the process progresses to "RETURN".

In Step S03, the multi-view screen is displayed on the display screen of the display device 19. When a screen (for example, the navigation screen or the like) other than the multi-view screen is switched to the multi-view screen, the same multi-view screen as the previous multi-view screen is displayed. That is, if the previous multi-view screen corresponded to the display mode based on the combination of the front view FV and the ground view GV, the multi-view screen of the same display mode is displayed. Meanwhile, when the current shift position is changed from the shift position when the previous multi-view screen was displayed, the multi-view screen of the display mode according to the current shift position is displayed. That is, even though the previous shift position was in the reverse position and the previous multi-view screen corresponded to the display mode based on the combination of the rear view RV and the ground view GV, if the current shift position is in a position other than the reverse position, the multi-view screen is displayed which is different from the previous multi-view screen and corresponds to the display mode based on the combination of the front view FV and the ground view GV according to predetermined initial settings.

In Step S04, it is determined whether or not the switch 16 is turned on.

When the determination result is "NO", the process progresses to Step S06 described below.

Meanwhile, when the determination result is "YES", the process progresses to Step S05.

In Step S05, the display mode of the multi-view screen is switched to a plurality of prescribed switchable display modes in a predetermined sequence (for example, the sequence of the display mode based on the combination of the rear view RV and the ground view GV, the display mode based on the combination of the rear view RV and the left and right mirror views MV, the display mode based on the combination of the rear view RV and the ground view GV, . . . ).

In Step S06, it is determined whether or not the retraction switch 17 is turned on.

When the determination result is "YES", the process progresses to Step S07 described below.

Meanwhile, when the determination result is "NO", the process progresses to Step S08.

In Step S07, a multi-view screen (in the retracted state) corresponding to the retracted state of the left and right side mirrors ML and MR is displayed, and then the process progresses to "RETURN".

In Step S08, a multi-view screen (not in the retracted state) corresponding to the extended state of the left and right side mirrors ML and MR is displayed, and then the process progresses to "RETURN".

The processing in a shift position except for the reverse position in Step S02 described above will be described in the following.

Figure 16:
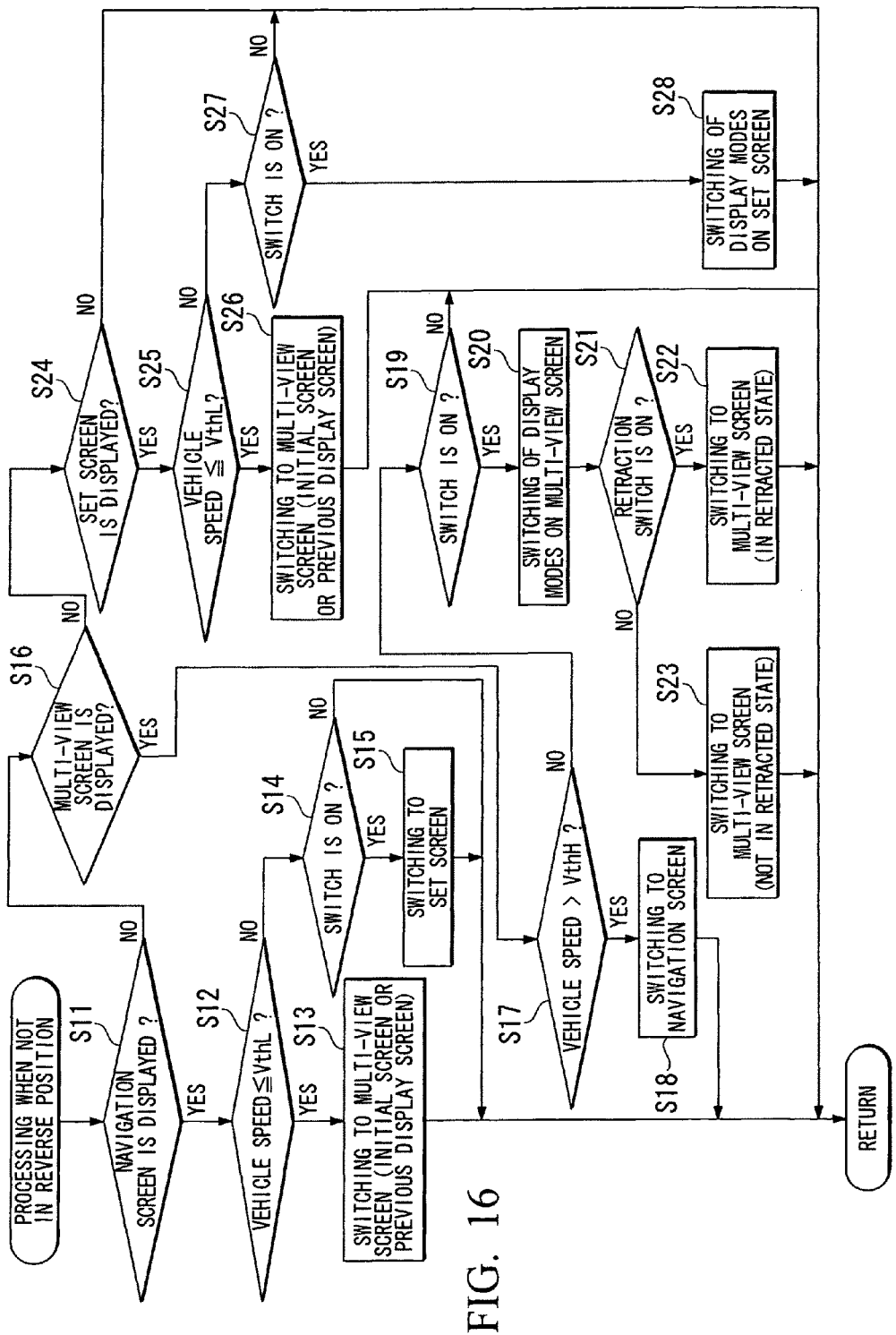
FIG. 16 is a flowchart of a processing in a shift position except for a reverse position shown in FIG. 15.

In Step S11 of FIG. 16, it is determined whether or not the navigation screen is being displayed.

When the determination result is "NO", the process progresses to Step S16 described below.

Meanwhile, when the determination result is "YES", the process progresses to Step S12.

In Step S12, it is determined whether or not the vehicle speed is equal to or lower than the predetermined low side determination threshold value VthL (for example, 12 km/h or the like).

When the determination result is "NO", the process progresses to Step S14 described below.

Meanwhile, when the determination result is "YES", the process progresses to Step S13.

In Step S13, display is switched from the navigation screen to a multi-view screen, and then the process progresses to "RETURN". In this case, the same multi-view screen as the previous multi-view screen, or a multi-view screen according to the predetermined initial settings is displayed.

In Step S14, it is determined whether or not the switch 16 is turned on.

When the determination result is "NO", the process progresses to "RETURN".

Meanwhile, when the determination result is "YES", the process progresses to Step S15.

In Step S15, display is switched from the navigation screen to the set screen, and then the process progresses to "RETURN".

In Step S16, it is determined whether or not a multi-view screen is being displayed.

When the determination result is "NO", the process progresses to Step S24 described below.

Meanwhile, when the determination result is "YES", the process progresses to Step S17.

In Step S17, it is determined whether or not the vehicle speed is higher than a predetermined high side determination threshold vale VthH (for example, 15 km/h or the like).

When the determination result is "NO", the process progresses to Step S19 described below.

Meanwhile, when the determination result is "YES", the process progresses to Step S18.

In Step S18, display is switched from the multi-view screen to the navigation screen, and then the process progresses to "RETURN".

In Step S19, it is determined whether or not the switch 16 is turned on.

When the determination result is "NO", the process progresses to "RETURN".

Meanwhile, when the determination result is "YES", the process progresses to Step S20.

In Step S20, the display mode of the multi-view screen is switched to a plurality of prescribed switchable display modes in a predetermined sequence (for example, the sequence of the display mode based on the combination of the front view FV and the ground view GV, the display mode based on the front blind view FBV, the display mode based on the side view SV, the display mode based on the combination of the front view FV and the ground view GV, . . . ).

In Step S21, it is determined whether or not the retraction switch 17 is turned on.

When the determination result is "YES", the process progresses to Step S22 described below.

Meanwhile, when the determination result is "NO", the process progresses to Step S23.

In Step S22, a multi-view screen (in the retracted state) corresponding to the retracted state of the left and right side mirrors ML and MR is displayed, and then the process progresses to "RETURN".

In Step S23, a multi-view screen (not in the retracted state) corresponding to the extended state of the left and right side mirrors ML and MR is displayed, and then the process progresses to "RETURN".

In Step S24, it is determined whether or not a set screen is being displayed.

When the determination result is "NO", the process progresses to "RETURN".

Meanwhile, when the determination result is "YES", the process progresses to Step S25.

In Step S25, it is determined whether or not the vehicle speed is equal to or lower than the predetermined low side threshold value VthL (for example, 12 km/h or the like).

When the determination result is "NO", the process progresses to Step S27 described below.

Meanwhile, when the determination result is "YES", the process progresses to Step S26.

In Step S26, display is switched from the navigation screen to the multi-view screen, and then the process progresses to "RETURN". In this case, the same multi-view screen as the previous multi-view screen, or a multi-view screen according to the predetermined initial setting is displayed.

In Step S27, it is determined whether or not the switch 16 is turned on.

When the determination result is "NO", the process progresses to "RETURN".

Meanwhile, when the determination result is "YES", the process progresses Step S28.

In Step S28, display is switched from the navigation screen to the set screen, and then the process progresses to "RETURN".

As described above, according to the vehicle surroundings monitoring apparatus 10 of the embodiment, the driver can easily recognize the imaging regions of the external camera 11 corresponding to the converted images displayed on the display device 19 (that is, the display regions displayed by the converted images in the external region of the present-vehicle) and selectable converted images at the time of display switching by the display mode indication image IP, the first auxiliary display mode indication image IPa, and the second auxiliary display mode indication image IPb.

The display state (for example, luminance or color) of the vehicle image (vehicle icon) VP which is displayed in the image of the ground view GV on the multi-view screen and the set screen or the like which has the same screen layout as the display mode having the ground view GV is appropriately changed between a plurality of different display states in accordance with the lighting state of the headlight (not shown) or the near-infrared LED 12, the brightness of other images on the display screen, the presence/absence of the mask image MP, or the like. Therefore, the driver's visibility of the display screen can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle surroundings monitoring apparatus comprising:
   a plurality of imaging units which capture an external region of a present-vehicle and output images;
   a display unit which is installed in an interior of the present-vehicle;
   a selector which selects an image to be displayed on the display unit from the images output from the imaging units; and
   a display control unit which displays the images output from the imaging units on the display unit so as to be switched in accordance with a selection by the selector and displays an image indicator display indicating a display region in the external region of the present-vehicle corresponding to the images so as to be switched by the selector on the display unit, wherein
   the image indicator display is highlighted corresponding to the images displayed on the display unit in the display control unit.

2. The vehicle surroundings monitoring apparatus according to claim 1, wherein
   the image indicator display is disposed in an upper portion of the display unit.

3. The vehicle surroundings monitoring apparatus according to claim 1, wherein the selector selects one image to be displayed on the display unit from the images output from the imaging units each corresponding to one of a plurality of imaging regions.

4. The vehicle surroundings monitoring apparatus according to claim 1, wherein the image indicator display indicates a plurality of display regions in the external region of the present-vehicle corresponding to the images so as to be switched by the selector on the display unit.

5. The vehicle surroundings monitoring apparatus according to claim 1, wherein the images that are switchable by the selector vary depending on a shift position.

6. The vehicle surroundings monitoring apparatus according to claim 1, wherein when the images include a side view and the side view is displayed on the display unit, an auxiliary display mode indicator which indicates a mutually switchable display mode between one side view and both side views is displayed on the display unit.

* * * * *